US009216907B2

(12) United States Patent
Nakano et al.

(10) Patent No.: US 9,216,907 B2
(45) Date of Patent: Dec. 22, 2015

(54) METHOD OF MANUFACTURING POSITIVE ELECTRODE ACTIVE MATERIAL FOR LITHIUM ION BATTERY, POSITIVE ELECTRODE ACTIVE MATERIAL FOR LITHIUM ION BATTERY, ELECTRODE FOR LITHIUM ION BATTERY, AND LITHIUM ION BATTERY

(75) Inventors: Masatsugu Nakano, Tokyo (JP); Akinori Yamazaki, Tokyo (JP)

(73) Assignee: SUMITOMO OSAKA CEMENT CO., LTD. (JP)

( * ) Notice: Subject to any disclaimer, the term of this patent is extended or adjusted under 35 U.S.C. 154(b) by 140 days.

(21) Appl. No.: 13/256,644

(22) PCT Filed: Mar. 25, 2010

(86) PCT No.: PCT/JP2010/002111
§ 371 (c)(1),
(2), (4) Date: Sep. 15, 2011

(87) PCT Pub. No.: WO2010/109869
PCT Pub. Date: Sep. 30, 2010

(65) Prior Publication Data
US 2012/0003540 A1 Jan. 5, 2012

(30) Foreign Application Priority Data

Mar. 27, 2009 (JP) ................................. 2009-080082
Feb. 24, 2010 (JP) ................................. 2010-038810

(51) Int. Cl.
*H01M 4/13* (2010.01)
*C01B 25/45* (2006.01)
(Continued)

(52) U.S. Cl.
CPC .............. *C01B 25/45* (2013.01); *H01M 4/5825* (2013.01); *H01M 4/485* (2013.01); *H01M 10/052* (2013.01); *H01M 10/0525* (2013.01)

(58) Field of Classification Search
CPC .......... H01M 10/0525; H01M 10/052; H01M 4/485; H01M 4/5825; C01B 25/45

USPC ................... 429/217, 221–224, 231.6, 231.5, 429/231.95, 322, 212–215
See application file for complete search history.

(56) References Cited

U.S. PATENT DOCUMENTS

2002/0192137 A1 12/2002 Chaloner-Gill et al.
2006/0222952 A1* 10/2006 Kono et al. ............. 429/231.95
(Continued)

FOREIGN PATENT DOCUMENTS

CA 2 623 629 3/2007
CA 2623629 * 3/2007
(Continued)

OTHER PUBLICATIONS

Examiner's Calculation Sheet.*
(Continued)

*Primary Examiner* — Milton I Cano
*Assistant Examiner* — Jimmy K Vo
(74) *Attorney, Agent, or Firm* — Merchant & Gould P.C.

(57) ABSTRACT

A method of manufacturing a positive electrode active material for lithium ion batteries, comprising: preparing a mixture containing (A) $Li_3PO_4$, or a Li source and a phosphoric acid source, (B) at least one selected from a group of an Fe source, a Mn source, a Co source and a Ni source, water and an aqueous organic solvent having a boiling point of 150° C. or more, wherein the amounts of (A) and (B) in the mixture are adjusted to amounts necessary to manufacture therefrom $LiMPO_4$, wherein M represents at least one selected from the group of Fe, Mn, Co and Ni, at a concentration of 0.5 to 1.5 mol/L; and generating fine particles of $LiMPO_4$ having an average primary particle diameter of 30 to 80 nm by reacting (A) and (B) at a high temperature and high pressure.

9 Claims, 1 Drawing Sheet

(51) Int. Cl.
*H01M 4/58* (2010.01)
*H01M 10/052* (2010.01)
*H01M 10/0525* (2010.01)
*H01M 4/485* (2010.01)

(56) References Cited

U.S. PATENT DOCUMENTS

| 2007/0054187 A1 | 3/2007 | Nuspl et al. | |
|---|---|---|---|
| 2007/0059598 A1* | 3/2007 | Yang | 429/209 |
| 2009/0176159 A1* | 7/2009 | Zhamu et al. | 429/222 |

FOREIGN PATENT DOCUMENTS

| JP | A-09-134725 | | 5/1997 | |
|---|---|---|---|---|
| JP | B-3484003 | | 1/2004 | |
| JP | 2005116393 A | * | 4/2005 | ............. H01M 4/58 |
| JP | A-2005-123107 | | 5/2005 | |
| JP | A-2005-276476 | | 10/2005 | |
| JP | T-2007-511458 | | 5/2007 | |
| JP | 2008066019 | * | 3/2008 | |
| JP | A-2008-66019 | | 3/2008 | |
| JP | A-2008-130526 | | 6/2008 | |
| JP | A-2008-159495 | | 7/2008 | |
| JP | A-2009-080082 | | 4/2009 | |
| JP | A-2010-038810 | | 2/2010 | |

OTHER PUBLICATIONS

Sumitomo Osaka Cement Co., Ltd., JP 2005116393 A, dated Apr. 2005, English Translation via dossier1.ipdl.inpit.go.jp/AIPN/odse_top_dn.ipdl?N000=7400, obtained Jun. 7, 2013.*

Sumitomo Osaka Cement Co., Ltd., JP 2005276476 A, dated Oct. 6, 2005, English Translation via dossier1.ipdl.inpit.go.jp/AIPN/odse_top_dn.ipdl?N000=7400, obtained Jun. 7, 2013.*

International Search Report for International Application No. PCT/JP2010/002111 mailed Jun. 22, 2010.

Padhi et al. "Phospho-olivines as Positive-Electrode Materials for Rechargeable Lithium Batteries," *J. Electrochem. Soc.*, 144(4): 1188-94 (Apr. 1997).

Shiraishi et al. "Synthesis of LiFePO$_4$ Cathode Active Material for Rechargeable Lithium Batteries by Hydrothermal Reaction," *J. Ceramic Soc. of Japan*, Supplement 112-1, PacRim5 Special Issues, 112(5): S58-S62 (2004).

Canadian Office Action for Canadian Patent Application No. 2755802 (mailed Oct. 23, 2012).

Chinese Office Action for Chinese Patent Application No. 201080012262.X (mailed Jun. 25, 2013).

Tajimi et al. "Enhanced electrochemical performance of LiFePO$_4$ prepared by hydrothermal reaction," *Solid State Ionics*, 175: 287-290 (2004).

* cited by examiner

METHOD OF MANUFACTURING POSITIVE ELECTRODE ACTIVE MATERIAL FOR LITHIUM ION BATTERY, POSITIVE ELECTRODE ACTIVE MATERIAL FOR LITHIUM ION BATTERY, ELECTRODE FOR LITHIUM ION BATTERY, AND LITHIUM ION BATTERY

This application is a U.S. National Stage Application under 35 U.S.C. §371 of International Patent Application No. PCT/JP2010/002111, filed 25 Mar. 2010, which claims the benefit of priority to Japanese Patent Application No. 2009-080082, filed 27 Mar. 2009 and Japanese Patent Application No. 2010-038810, filed 24 Feb. 2010, the disclosures of all of which are hereby incorporated by reference in their entireties. The International Application was published in Japanese on 30 Sep. 2010 as WO 2010/109869.

TECHNICAL FIELD

The present invention relates to a method of manufacturing a positive electrode active material for lithium ion batteries, a positive electrode active material for lithium ion batteries, an electrode for lithium ion batteries, and a lithium ion battery.

BACKGROUND

In comparison to aqueous electrodes in the related art such as a Ni—Cd electrode or a Ni—H electrode, non-aqueous lithium ion electrodes have a high energy density and can be easily reduced in size, and therefore non-aqueous lithium ion electrodes are widely used for mobile devices such as mobile phones, mobile information terminals, and personal computers. As a positive electrode material for non-aqueous lithium ion batteries, currently, $LiCoO_2$ has been put into practical use and is commonly used.

However, when $LiCoO_2$ is used as it is as a positive electrode material for non-aqueous lithium ion batteries in the field of large-sized batteries or the like that are mounted on hybrid vehicles, electric vehicles, and uninterruptible power systems which are expected to be developed in the future, a variety of problems may occur as described below.

One of those problems is the difficulties in the resource and cost aspects in stably procuring a large amount of cobalt (Co) since $LiCoO_2$ includes cobalt (Co), which is a rare metal.

In addition, since $LiCoO_2$ generates oxygen at a high temperature, safety should be sufficiently considered in preparation for the cases of abnormal heat generation or short-circuiting in a battery, and therefore it is highly risky to apply $LiCoO_2$ to large-sized batteries without sufficiently considering safety.

As a result, in recent years, instead of a positive electrode active material using $LiCoO_2$, positive electrode materials which are cheap and safe, and have a phosphate backbone have been suggested. Among them, $LiFePO_4$ having an olivine structure is gaining attention as a positive electrode material which is safe and also has no problem in the resource and cost aspects, and is being studied and developed across the world (For example, see Patent document 1, Non-Patent document 1, or the like).

Olivine-type positive electrode materials represented by $LiFePO_4$ contain iron (Fe). In comparison to cobalt and manganese, iron is a rich natural resource and thus is cheap. In addition, due to the covalent bonding between phosphorous and oxygen, the olivine structure does not emit oxygen at a high temperature unlike cobalt-based positive electrode active materials such as $LiCoO_2$, and is also a material excellent in terms of stability.

However, even for $LiFePO_4$ having the above advantages, problems have been pointed out in the characteristics aspect.

One problem is a low conductivity thereof, but in relation to which a number of attempts to improve the conductivity have been carried out in recent years by, particularly, forming the complex of $LiFePO_4$ and carbon, coating carbon on the surface of $LiFePO_4$, or the like.

Another problem is a low degree of diffusion of lithium ions during charging and discharging. For example, in compounds having a layered structure such as $LiCoO_2$, or a spinel structure such as $LiMnO_2$, lithium ions diffuse in two dimension or three dimension during charging and discharging; however, in compounds having an olivine structure such as $LiFePO_4$, lithium diffuses only in one dimension. Furthermore, the electrode reaction during charging and discharging is a two-phase reaction in which $LiFePO_4$ and $FePO_4$ are repeatedly converted, and therefore $LiFePO_4$ is considered to be disadvantageous for high-speed charging and discharging.

As methods for solving the above problems, the method which is considered to be most effective is the reduction of the diameters of $LiFePO_4$ particles. That is, even when lithium ions diffuse in one dimension, if diffusion distance is shortened by the reduction of particle diameters, it is considered that an increase in the speed of charging and discharging can be coped with.

In the past, as a method of synthesizing $LiFePO_4$, the solid-phase method was used. In the solid-phase method, since raw materials of $LiFePO_4$ are mixed in a stoichiometric proportion and then are fired in an inert atmosphere, there are problems in that $LiFePO_4$ having a desired composition cannot be obtained without the skilled selection of firing conditions, and it is difficult to control particle diameters such that it is difficult to reduce particle diameters. Here, as a method of reducing the particle diameters of $LiFePO_4$, studies regarding a liquid-phase synthesis method in which a hydrothermal reaction is used are underway.

The advantage of the hydrothermal reaction is that highly pure products can be obtained at a markedly low temperature in comparison to a solid-phase reaction. However, in the hydrothermal reaction, the control of particle diameters is strongly dependent on factors related to reaction conditions such as a reaction temperature or time. In addition, when the control is performed using the above factors, the performance of a manufacturing apparatus strongly affects the control, which causes difficulties in reproducibility.

Therefore, as a method of generating the fine particles of $LiFePO_4$ by the hydrothermal reaction, a method is suggested in which organic acid or ion such as $CH_3COO^-$, $SO_4^{2-}$ or $Cl^-$ is also fed to a solvent, or Li is excessively added during the hydrothermal reaction, thereby obtaining the fine particles of single-phase $LiFePO_4$ (for example, see Patent document 2 and Non-patent document 2). In addition, a method is suggested in which reaction intermediates are mechanically crushed so as to obtain the fine particles of $LiFePO_4$ having small particle diameters (Patent document 3).

However, discharge voltage of $LiFePO_4$ is low, and thus is considered as an electrode material not suitable for uses in which a high output is required, for example, electric tools and hybrid vehicles. As a result, as positive electrode materials having the olivine structure other than $LiFePO_4$, $LiMnPO_4$, $LiCoPO_4$ or the like, which are positive electrode materials that can use the stability of the olivine structure and can be used at a high voltage, are considered as alternatives.

Patent Documents

Patent document 1: Japanese Patent No. 3484003

Patent document 2: Japanese Unexamined Patent Application, First Publication No. 2008-66019

Patent document 3: Japanese Unexamined Patent Application Publication (Translation of PCT Application) No.-2007-511458

Non Patent Document

Non-Patent document 1: "Phospho-olivine as Positive-Electrode Material for Rechargeable Lithium Batteries," by A. K. Padhi et al., P 1188, Issue 4, Vol. 144, J. Electrochem. Soc. (1997)

Non-Patent document 2: "Synthesis of LiFePO$_4$ cathode active material for Rechargeable Lithium Batteries by Hydrothermal Reaction," by Keisuke Shiraishi, Young Ho Rho and Kiyoshi Kanamura, P. S58 to S62, Issue 1305, Suppl. 112, J. Ceram. Soc. Jpn (2004).

DETAILED DESCRIPTION

Problem to be Solved by the Invention

In the method in which the fine particles of LiFePO$_4$ are generated by a hydrothermal reaction in the related art as described above, the fine particles of LiFePO$_4$ are reliably obtained, and desired load characteristics are also improved, but there are problems in that the initial discharge capacity is degraded, and, furthermore, high-speed charging and discharging characteristics are degraded.

Those phenomena are considered to result from the wide particle size distribution of the fine particles of LiFePO$_4$ generated. Due to the wide particle size distribution, the possibility of the presence of amorphous ultrafine particles, which do not contribute to charging and discharging, is increased such that the initial discharge capacity is degraded, and, furthermore, high-speed charging and discharging characteristics are degraded.

In addition, in positive electrode materials in which LiMnPO$_4$, LiCoPO$_4$ or the like is used, certainly, the discharge voltage is high, and a high output is obtained, but there is a problem in that the conductivity is lower than that of LiFePO$_4$. Therefore, it is necessary to further reduce the resistivity and particle diameters of the positive electrode materials, but such characteristics have not yet been sufficiently fulfilled.

The present invention has been made in consideration of the above circumstances, and the object of the present invention is to provide a method of manufacturing a positive electrode active material for lithium ion batteries; a positive electrode active material for lithium ion batteries; an electrode for lithium ion batteries; and a lithium ion battery; wherein the average primary particle diameter of fine particles of LiMPO$_4$ (wherein M represents one or two or more kinds selected from the group of Fe, Mn, Co and Ni) is controlled so that fine particles of LiMPO$_4$ having a narrow particle size distribution can be obtained, the initial discharge capacity can be improved, and furthermore, high-speed charging and discharging characteristics can be improved.

As a result of thorough studies for solving the above problems, the present inventors paid attention to a solvothermal method which has been gaining attention in recent years as a method of synthesizing nano particles, and combined this method into the hydrothermal synthesis reaction of LiMPO$_4$ (wherein M represents one or two or more kinds selected from the group of Fe, Mn, Co and Ni) when the fine particles of LiMPO$_4$ are generated using the hydrothermal reaction. Then, the inventors found an unexpected excellent result in which, by substituting a part of water, which is used as a solvent, with an aqueous organic solvent before the hydrothermal reaction, the particle diameters and crystallinity of the fine particles of the obtained LiMPO$_4$ can be controlled according to the types or substituted amount of the aqueous organic solvent, and, furthermore, the battery characteristics can be controlled, and completed the present invention.

Means for Solving the Problem

The method of manufacturing a positive electrode active material for lithium ion batteries according to the present invention, is characterized in that the method includes: reacting a mixture at a high temperature and a high pressure, wherein the mixture contains Li$_3$PO$_4$ or a Li source and a phosphoric acid source, and one or two or more kinds selected from a group of a Fe source, a Mn source, a Co source and a Ni source, in amounts necessary to generate from 0.5 to 1.5 mol/L of LiMPO$_4$ (wherein M represents one or two or more kinds selected from the group of Fe, Mn, Co and Ni), and also contains water and an aqueous organic solvent having a boiling point of 150° C. or more, to generate fine particles of LiMPO$_4$ (wherein M represents one or two or more kinds selected from the group of Fe, Mn, Co and Ni) having an average primary particle diameter of from 30 to 80 nm.

In more detail, the method of manufacturing a positive electrode active material for lithium ion batteries is characterized in that the method includes:

preparing a mixture containing (A) Li$_3$PO$_4$, or a Li source and a phosphoric acid source; (B) at least one selected from a group of a Fe source, a Mn source, a Co source and a Ni source; water; and an aqueous organic solvent having a boiling point of 150° C. or more; wherein the amounts of (A) and (B) in the mixture are adjusted to amounts necessary to manufacture therefrom LiMPO$_4$ (wherein M represents at least one selected from the group of Fe, Mn, Co and Ni) at a concentration of more than or equal to 0.5 mol/L and less than or equal to 1.5 mol/L; and generating fine particles of LiMPO$_4$ (wherein M represents one or two or more kinds selected from the group of Fe, Mn, Co and Ni) having an average primary particle diameter of from 30 to 80 nm by reacting the (A) and the (B) at a high temperature and a high pressure.

The aqueous organic solvent is preferably at least one selected from multivalent alcohols, amides, esters and ethers.

The content of the aqueous organic solvent is preferably from 3 to 30% by mass of the total mass of the mixture.

The positive electrode active material for lithium ion batteries according to the present invention is characterized in that the material is obtained by the method of manufacturing a positive electrode active material for lithium ion batteries according to the present invention.

The electrode for lithium ion batteries according to the invention is characterized in that the electrode is formed by coating carbon on the positive electrode active material for lithium ion batteries according to the present invention.

The lithium ion battery according to the present invention is characterized in that the battery comprises the electrode for lithium ion batteries according to the present invention as a positive electrode.

EFFECTS OF INVENTION

According to the method of manufacturing a positive electrode active material for lithium ion batteries of the present invention, a mixture containing Li$_3$PO$_4$, or a Li source and a phosphoric acid source, and one or two or more kinds selected from a group of a Fe source, a Mn source, a Co source and a Ni source, in amounts necessary to generate from 0.5 to 1.5 mol/L of $LiMPO_4$ (wherein M represents one or two or more kinds selected from the group of Fe, Mn, Co and Ni), and also containing water and an aqueous organic solvent having a boiling point of 150° C. or more is reacted at a high temperature and a high pressure. Therefore, the fine particles of LiMPO4 (wherein M represents one or two or more kinds selected from the group of Fe, Mn, Co and Ni) having an average primary particle diameter of from 30 to 80 nm are generated, and it is possible to efficiently generate the fine particles of $LiMPO_4$ (wherein M represents one or two or more kinds selected from the group of Fe, Mn, Co and Ni) having a small average primary particle diameter and a narrow particle size distribution. Furthermore, the average primary particle diameter of the fine particles of the $LiMPO_4$ can be controlled by changing the types and content of the aqueous organic solvent.

According to the positive electrode active material for lithium ion batteries of the present invention, since the fine particles of $LiMPO_4$ (wherein M represents one or two or more kinds selected from the group of Fe, Mn, Co and Ni) have an average primary particle diameter in a range of 30 to 80 nm and a small particle size distribution, it is possible to improve the initial discharge capacity and, furthermore, to improve high-speed charging and discharging characteristics.

According to the electrode for lithium ion batteries of the present invention, since the positive electrode active material for lithium ion batteries of the present invention is coated with carbon, it is possible to improve the conductivity of the positive electrode active material.

According to the lithium ion battery of the present invention, since the electrode for lithium ion batteries of the present invention is provided as the positive electrode, it is possible to improve the conductivity of the positive electrode. Accordingly, it is possible to improve initial discharge capacity, and also improve high-speed charging and discharging characteristics.

BEST MODE FOR CARRYING OUT THE INVENTION

Figure 1:
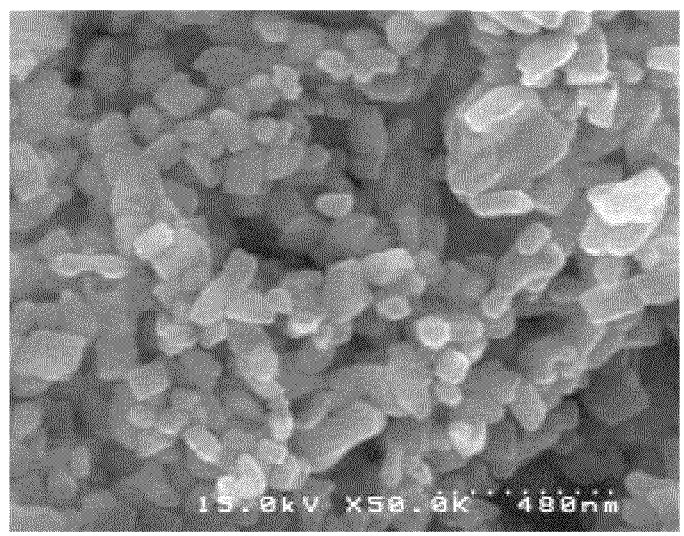
FIG. 1 is a field emission scanning electron microscope (FE-SEM) image showing a positive electrode active material of Example 2 of the present invention.

The present invention relates to a method of manufacturing a positive electrode active material for lithium ion batteries, a positive electrode active material for lithium ion batteries, an electrode for lithium ion batteries and a lithium ion battery. In more detail, the present invention relates to a method of manufacturing a positive electrode active material for lithium ion batteries in which the discharge capacity can be improved by controlling the average primary particle diameter of the fine particles of $LiFePO_4$, a positive electrode active material for lithium ion batteries obtained by the above method, an electrode for lithium ion batteries and a lithium ion battery, wherein the electrode and the battery uses said positive electrode active material for lithium ion batteries.

Embodiments for carrying out the method of manufacturing a positive electrode active material for lithium ion batteries, the positive electrode active material for lithium ion batteries, the electrode for lithium ion batteries, and the lithium ion battery according to the present invention will be described.

The embodiments are detailed description for better understanding of the gist of the present invention, and, unless specified otherwise, the present invention is not limited thereto. For example, unless particularly limited, conditions or the like such as materials, amounts, types, number, sizes, or temperature, may be varied, added, and omitted according to necessity.

"Method of Manufacturing a Positive Electrode Active Material for Lithium Ion Batteries"

The method of manufacturing a positive electrode active material for lithium ion batteries according to the embodiment is a method in which a mixture which contains $Li_3PO_4$, or a Li source and a phosphoric acid source, and one or two or more kinds selected from a group of a Fe source, a Mn source, a Co source, and a Ni source, in amounts necessary to generate from 0.5 to 1.5 mol/L of $LiMPO_4$ (wherein M represents one or two or more kinds selected from a group of Fe, Mn, Co and Ni), and also contains water and an aqueous organic solvent having a boiling point of 150° C. or more, is reacted at a high temperature and a high pressure so that the fine particles of $LiMPO_4$ (wherein M represents one or two or more kinds selected from the group of Fe, Mn, Co and Ni) having an average primary particle diameter of 30 nm or more and 80 nm or less are generated.

Hereinafter, the fine particles of $LiMPO_4$ (wherein M represents one or two or more kinds selected from the group of Fe, Mn, Co and Ni) will be referred to simply as "the fine particles of $LiMPO_4$."

When the fine particles of $LiMPO_4$ are synthesized by a hydrothermal reaction, there are methods in which a Li source such as Li salt, a phosphoric acid source such as $PO_4$ salt, and an M source such as M salt (wherein M represents one or two or more kinds selected from a group of Fe, Mn, Co and Ni) are used as synthesis raw materials; in which $Li_3PO_4$ that has been obtained by reacting a Li source and a phosphoric acid source is used, and, furthermore, an M source is used; and in which a phosphate of M that has been obtained by reacting an M source and a phosphoric acid source is used, and, furthermore, a Li source is used.

However, among the phosphates of M, $Fe_3(PO_4)_2$ is liable to be oxidized, and thus is difficult to be handled. In the present invention, it is preferable to use $Li_3PO_4$ and Fe(II) salt as raw materials.

In the method in which a Li source, an M source and a phosphoric acid source are used, since $Li_3PO_4$ is generated in the initial phase of the reaction, the method becomes equivalent to the method in which $Li_3PO_4$ is used. Therefore, a method is preferable in which, in the beginning, $Li_3PO_4$ is synthesized, and then the $Li_3PO_4$ and an M source are hydrothermally reacted so as to synthesize the fine particles of $LiMPO_4$ (wherein M represents one or two or more kinds selected from a group of Fe, Mn, Co and Ni).

Next, a preferable method of manufacturing the fine particles of the $LiMPO_4$ will be described in detail.

1. Manufacture of a Lithium Phosphate ($Li_3PO_4$) Slurry

Firstly, a Li source and a phosphoric acid source are fed into water, and the Li source and the phosphoric acid source are reacted to generate lithium phosphate ($Li_3PO_4$), so that a lithium phosphate ($Li_3PO_4$) slurry is generated. The Li source and the phosphoric acid source are selected according to necessity, but it is preferable to adjust the amounts or ratios thereof so that no unreacted Li source or phosphoric acid source remain.

The Li source refers to a substance that contains at least a lithium element and can supply lithium ion in order to manufacture a target compound. As the Li source, hydroxides of Li or salts of Li are preferable, and examples of the hydroxides of Li include lithium hydroxide (LiOH). In addition, examples of the salts of Li include lithium inorganic acid salts such as lithium carbonate ($Li_2CO_3$) and lithium chloride (LiCl), lithium organic acid salts such as lithium acetate ($LiCH_3COO$) and lithium oxalate ($(COOLi)_2$), and hydrates thereof, and one or two or more kinds selected from the above groups are preferably used.

The phosphoric acid source refers to a substance that contains at least phosphoric acid and can supply phosphoric acid ion in order to manufacture a target compound. As the phosphoric acid source, one or two or more kinds selected from a group of phosphoric acid such as orthophosphoric acid ($H_3PO_4$) and metaphosphoric acid ($HPO_3$), ammonium dihydrogenphosphate ($NH_4H_2PO_4$), diammonium hydrogen phosphate ($(NH_4)_2HPO_4$), ammonium phosphate ($(NH_4)_3PO_4$) and hydrates thereof are preferably used. Among them, orthophosphoric acid, ammonium dihydrogenphosphate and diammonium hydrogen phosphate are preferable since they have a relatively high purity and their compositions are easily controlled.

A slurry may be manufactured by directly adding $Li_3PO_4$ to water.

2. Manufacture of a Mixture of Lithium Phosphate ($Li_3PO_4$) and a M Source

A M source and a reducing agent are added to the lithium phosphate ($Li_3PO_4$) slurry obtained in the above manner to produce a mixture. The M source is selected according to necessity, but it is preferable to adjust the amount and ratio thereof so that no unreacted M source remains.

The M source refers to a substance that contains at least M and can supply M ion in order to manufacture a target compound. Herein, M represents Fe, Mn, Co and/or Ni. As the M source, salts of M are preferable, and, for example, one or two or more kinds selected from a group of ferrous chloride ($FeCl_2$), ferrous sulfate ($FeSO_4$), ferrous acetate (II) ($Fe(CH_3COO)_2$), manganese (II) chloride ($MnCl_2$), manganese (II) sulfate ($MnSO_4$), manganese (II) acetate ($Mn(CH_3COO)_2$), manganese (II) nitrate ($Mn(NO_3)_2$), cobalt (II) chloride ($CoCl_2$), cobalt (II) sulfate ($CoSO_4$), cobalt (II) acetate ($Co(CH_3COO)_2$), nickel (II) chloride ($NiCl_2$), nickel (II) sulfate ($NiSO_4$), nickel (II) acetate ($Ni(CH_3COO)_2$) and hydrates thereof are preferably used.

A reaction concentration, that is, the concentration of $Li_3PO_4$ and the M source in the mixture is preferably 0.5 mol/L or more and 1.5 mol/L or less, and more preferably 0.7 mol/L or more and 1.2 mol/L or less, wherein they are contained in an amount converted to generate $LiMPO_4$. The concentration may be controlled to be in a preferable range by newly adding water to the mixture before the reaction starts at a high temperature and a high pressure.

The reason is that, when the reaction concentration is less than 0.5 mol/L, $LiMPO_4$ having large particle diameters is liable to be generated, and it is highly likely that load characteristics may be degraded due to the reasons as described above. On the other hand, when the reaction concentration exceeds 1.5 mol/L, there is a possibility that the mixture may not be sufficiently stirred, and thus the reaction may not proceed sufficiently such that unreacted substances remain, making it difficult to obtain single-phase $LiMPO_4$, whereby the mixture cannot be used as an electrode material.

In the present invention, the concentration of materials wherein they are contained in an amount converted to generate $LiMPO_4$ means a concentration of materials which are used to manufacture $LiMPO_4$. Raw materials are selected so that the concentration of the finally manufactured $LiMPO_4$ falls in a range of 0.5 to 1.5 mol/L. Here, the concentration of any of the raw materials may be outside the range of 0.5 to 1.5 mol/L. For example, the concentration of $Li_3PO_4$ or the M source in the mixture, which will be subjected to a reaction at a high temperature and a high pressure, is preferably from 0.5 to 1.5 mol/L, and more preferably 0.7 to 1.2 mol/L. On the other hand, when lithium chloride is used as the Li source and phosphoric acid is used as the phosphoric acid source to prepare $Li_3PO_4$, the concentration of the used lithium chloride may be outside the above range, for example, may be 3 mol/L or the like. However, it is preferable to select the mixing ratio of materials so that no unreacted materials remain.

As a solvent used for the mixture, a mixed solvent of water and an aqueous organic solvent having a boiling point of 150° C. or more is used. The upper limit of the boiling point of an aqueous organic solvent that can be used for the present invention is not limited; however, as a rough standard, generally 300° C. or lower is preferable.

As the aqueous organic solvent, one or a mixture of two or more kinds selected from a group of multivalent alcohols such as ethylene glycol, propylene glycol, hexylene glycol or glycerine, amides such as formamide, N-methylformamide, 2-pyrrolidine or N-methyl-2-pyrrolidinone, esters such as γ-butyrolactone and ethers such as diethylene glycol, ethylene glycol monobutyl ether (butyl cellosolve), can be used.

Among them, multivalent alcohols are preferable, and ethylene glycol is particularly preferable.

The mixed solvent can be obtained by substituting a part of water with an aqueous organic solvent, before the reaction starts at a high temperature and a high pressure. It is preferable that an aqueous organic solvent is substituted such that the content of the aqueous organic solvent with respect to the total mass supplied to the hydrothermal reaction, that is, with respect to the total mass of the mixture, is from 3 to 30% by mass, more preferably 5 to 15% by mass, and even more preferably 7 to 10% by mass.

When the substitution amount of the aqueous organic solvent, that is, the content of the aqueous organic solvent is less than 3% by mass, the fine particles of $LiMPO_4$ generated and battery characteristics are substantially the same as those when the solvent is only water, and therefore the effect of substitution is not obtained. On the other hand, when the substitution amount exceeds 30% by mass, salts are generated as byproducts and act as impurities, which causes deterioration of battery characteristics.

As such, the amount of the aqueous organic solvent is defined with respect to the total mass supplied to the hydrothermal reaction, that is, the total mass of the mixture. For example, '5% by mass' means that water in the reaction system which is as much as 5% by mass of the mass supplied to the hydrothermal reaction is substituted with an aqueous organic solvent.

3. Hydrothermal Synthesis of the Mixture

The aforementioned mixture is reacted (hydrothermally synthesized) under the condition of a high temperature and a high pressure, and a reaction product including the fine particles of $LiMPO_4$ is obtained.

The condition of a high temperature and a high pressure is not particularly limited as long as the condition is within the scope of temperature, pressure, and time in which the fine particles of $LiMPO_4$ are generated. The reaction temperature can be arbitrarily selected, and can be higher than 100° C. and 300° C. or less, preferably from 120 to 250° C. and more preferably from 150 to 220° C.

However, the reaction temperature preferably does not exceed the boiling point of the aqueous organic solvent which is used to substitution. The reason is that, when the aqueous organic solvent is exposed to a high temperature condition significantly exceeding the boiling point thereof in a pressurized vessel, the aqueous organic solvent is decomposed so as to abruptly increase the pressure in the reaction vessel, which may lead to a problem in terms of safety.

In addition, the pressure during the reaction can be arbitrarily selected, and can be, for example, higher than 0.1 MPa and 10 MPa or less, preferably from 0.2 to 4.0 MPa, and more preferably from 0.4 to 2.5 MPa. The reaction time can be arbitrarily selected, and is preferably 1 to 24 hours, and more preferably 3 to 12 hours, although it is also dependent on the reaction temperature.

4. Separation of the Fine Particles of $LiMPO_4$

The reaction product including the aforementioned fine particles of $LiMPO_4$ is separated into the fine particles of $LiMPO_4$ and a Li-containing liquid waste (a solution including unreacted Li) by an appropriate method such as decantation, centrifugation or filter filtration.

The separated fine particles of $LiMPO_4$ are dried by an arbitrary method, for example, dried for 3 hours or more at 40° C. or more using a drying equipment, whereby it is possible to efficiently obtain the fine particles of $LiMPO_4$ having an average primary particle diameter of from 30 to 80 nm. The average primary particle diameter can be obtained by the SEM image evaluation of the fine particles.

"Positive Electrode Active Material for Lithium Ion Batteries"

The average primary particle diameter of the fine particles of $LiMPO_4$ obtained in the above conditions is from 30 to 80 nm. As such, by using the fine particles of $LiMPO_4$ having a small average primary particle diameter as a positive electrode active material for lithium ion batteries, the diffusion distance of Li becomes short, and the improved high-speed charging and discharging characteristics can be achieved in an electrode for lithium ion batteries and a lithium ion battery provided with the positive electrode active material for lithium ion batteries.

Here, when the average primary particle diameter is 30 nm or more, there is no case in which the particles are fractured by structural changes caused by the insertion and detachment of Li, and the specific surface area becomes significantly large such that the surface activity is extremely increased. Therefore, the amount of a joining agent that combines the fine particles does not need to be large, and, consequently, there is no problematic case in which the packing density of the positive electrode is significantly decreased, or the conductivity is significantly degraded. On the other hand, when the average primary particle diameter is 80 nm or less, the internal resistance of the positive electrode active material does not become large, and the migration of Li ions is also not delayed, whereby problem in which the discharge capacity is decreased or the like does not occur.

"Electrode for Lithium Ion Batteries and Lithium Ion Battery"

In order to use the aforementioned positive electrode active material for lithium ion batteries for a lithium ion battery, particularly as a positive electrode active material for the positive electrode in a lithium ion rechargeable battery, the surfaces of the fine particles of $LiMPO_4$ are preferably coated with carbon.

When the surfaces thereof are coated with carbon, the conductivity, which is the previously described problem of $LiFePO_4$, is improved, and favorable results can be obtained which are suitable as battery characteristics.

The method of carbon coating can be arbitrarily selected. For example, a method can be used in which the fine particles of $LiMPO_4$ are mixed with a carbon source such as a water-soluble monosaccharide or polysaccharide, or a water-soluble polymer compound; a film is formed uniformly on the surfaces of the fine particles of $LiFePO_4$ using a drying method such as the evaporative drying method, the vacuum drying method, the spray drying method and the freeze drying method, and subsequently, is fired under an inert atmosphere and a temperature at which the carbon source is decomposed so as to generate carbon; and a conductive carbon film is formed on the surfaces of the fine particles of $LiMPO_4$.

The firing temperature can be arbitrarily selected. The temperature is dependent on the type of the carbon source, but is preferably in a range of 500 to 1000° C., and more preferably 700 to 800° C.

At a low temperature of lower than 500° C., the decomposition of the carbon source is not sufficient, and the generation of the conductive carbon film becomes insufficient, which causes resistance in the battery, whereby there is a possibility that the battery characteristics may be adversely affected. On the other hand, at a high temperature exceeding 1000° C., the particle growth of the fine particles of $LiMPO_4$ proceeds such that the fine particles are coarsened, and there is a possibility that high-speed charging and discharging characteristics may be significantly degraded due to the diffusion speed of Li which is a problem of the particles of $LiFePO_4$.

As such, by coating the fine particles of $LiMPO_4$, which is the positive electrode active material for lithium ion batteries, with carbon, the fine particles of $LiMPO_4$ become preferable for a lithium ion battery, particularly as a positive electrode active material for the positive electrode in a lithium ion rechargeable battery.

By using the electrode formed using the carbon-coated fine particles of $LiMPO_4$ for a positive electrode, and, furthermore, providing a negative electrode, an electrolyte, and a separator, a lithium ion battery can be obtained.

In the lithium ion battery, the positive electrode is formed using the carbon-coated fine particles of $LiMPO_4$ obtained by coating the surfaces of the fine particles of $LiMPO_4$, which has an average primary particle diameter of 30 nm or more and 80 nm or less, with a conductive carbon film. Therefore, the initial discharge capacity is improved, and high-speed charging and discharging characteristics are also excellent.

EXAMPLES

Hereinafter, the present invention will be described specifically with reference to examples and comparative examples, but the present invention is not limited to the examples.

Example 1

3 mol of lithium chloride (LiCl) and 1 mol of phosphoric acid ($H_3PO_4$) were added to 1 L of pure water and stirred to obtain a lithium phosphate ($Li_3PO_4$) slurry.

Next, 1 mol of ferrous chloride ($FeCl_2$) was added to the slurry, a part of water included in the slurry was substituted with ethylene glycol so that the content of the ferrous chloride became 10% by mass with respect to the total mass supplied to the hydrothermal reaction. Furthermore, water was further added to the mixture so as to produce a total amount of 2 L (the total mass supplied to the hydrothermal reaction) of fluid including raw materials. When the reaction concentration of the fluid including raw materials was converted to that of LiFePO$_4$, the reaction concentration was 0.5 mol/L in terms of LiFePO$_4$.

Next, in order to perform the hydrothermal reaction, the fluid was provided in an autoclave, and, after an inert gas was introduced, the fluid was hydrothermally reacted for 6 hours at 180° C. and 1.2 MPa. After that, the fluid was filtered and separated into solid and liquid.

Next, the same amount of water as the mass of the separated solid was added so as to suspend the solid, an operation that separates solid and liquid by filtration was performed three times to wash the solid.

5 g of polyethylene glycol and 150 g of pure water were added to 150 g (in terms of solid content) of the obtained cake-like LiFePO$_4$, and a crushing and dispersion treatment was performed for 12 hours by a ball mill using zirconia beads having a diameter of 5 mm as media, thereby preparing a uniform slurry.

Next, the slurry was sprayed in the atmosphere of 180° C. and thus dried to obtain granular materials having an average particle diameter of about 6 μm. The granular materials were fired for 1 hour under an inert atmosphere at 750° C. so as to manufacture a positive electrode active material for lithium ion batteries of Example 1.

Example 2

Except that the reaction concentration of the fluid including raw materials was set to 1.0 mol/L in terms of LiFePO$_4$, that is, the amounts of the raw materials (lithium chloride, phosphoric acid and ferrous chloride) were doubled respectively, and adjustment was made so that the total amount of the fluid became 2 L, a positive electrode active material for lithium ion batteries of Example 2 was manufactured based on Example 1.

Example 3

Except that the reaction concentration of the fluid including raw materials was set to 1.5 mol/L in terms of LiFePO$_4$, that is, the amounts of the raw materials were increased to 1.5 times respectively, and adjustment was made so that the total amount of the fluid became 2 L, a positive electrode active material for lithium ion batteries of Example 3 was manufactured based on Example 1.

Example 4

Except that the reaction concentration of the fluid including raw materials was set to 1.0 mol/L in terms of LiFePO$_4$, and the substitution amount of ethylene glycol was set to 3% by mass with respect to the total mass supplied to the hydrothermal reaction, a positive electrode active material for lithium ion batteries of Example 4 was manufactured based on Example 2.

Example 5

Except that the reaction concentration of the fluid including raw materials was set to 1.0 mol/L in terms of LiFePO$_4$, and the substitution amount of ethylene glycol was set to 30% by mass with respect to the total mass supplied to the hydrothermal reaction, a positive electrode active material for lithium ion batteries of Example 5 was manufactured based on Example 2.

Example 6

Except that the reaction concentration of the fluid including raw materials was set to 1.0 mol/L in terms of LiFePO$_4$, glycol was used instead of ethylene glycol, and the substitution amount of glycol was set to 10% by mass with respect to the total mass supplied to the hydrothermal reaction, a positive electrode active material for lithium ion batteries of Example 6 was manufactured based on Example 2.

Example 7

Except that the reaction concentration of the fluid including raw materials was set to 1.0 mol/L in terms of LiFePO$_4$, diethylene glycol was used instead of ethylene glycol, and the substitution amount of diethylene glycol was set to 10% by mass with respect to the total mass supplied to the hydrothermal reaction, a positive electrode active material for lithium ion batteries of Example 7 was manufactured based on Example 2.

Example 8

Except that the reaction concentration of the fluid including raw materials was set to 1.0 mol/L in terms of LiFePO$_4$, N-methyl-2-pyrroridine was used instead of ethylene glycol, and the substitution amount of N-methyl-2-pyrroridine was set to 10% by mass with respect to the total mass supplied to the hydrothermal reaction, a positive electrode active material for lithium ion batteries of Example 8 was manufactured based on Example 2.

Example 9

Except that the reaction concentration of the fluid including raw materials was set to 1.0 mol/L in terms of LiFePO$_4$, γ-butyrolactone was used instead of ethylene glycol, and the substitution amount of γ-butyrolactone was set to 10% by mass with respect to the total mass supplied to the hydrothermal reaction, a positive electrode active material for lithium ion batteries of Example 9 was manufactured based on Example 2.

Example 10

Except that ferrous chloride (FeCl$_2$) was substituted with manganese (II) chloride (MnCl$_2$), and the reaction concentration of the fluid including raw materials was set to 1.0 mol/L in terms of LiMnPO$_4$, a positive electrode active material for lithium ion batteries of Example 10 was manufactured based on Example 2.

Example 11

Except that ferrous chloride (FeCl$_2$) was substituted with cobalt (II) chloride (CoCl$_2$), and the reaction concentration of the fluid including raw materials was set to 1.0 mol/L in terms of LiCoPO$_4$, a positive electrode active material for lithium ion batteries of Example 11 was manufactured based on Example 2.

Example 12

Except that ferrous chloride (FeCl$_2$) was substituted with nickel (II) chloride (NiCl$_2$), and the reaction concentration of the fluid including raw materials was set to 1.0 mol/L in terms of LiNiPO$_4$, a positive electrode active material for lithium ion batteries of Example 12 was manufactured based on Example 2.

Comparative Example 1

Except that the reaction concentration of the fluid including raw materials was set to 1.0 mol/L in terms of LiFePO$_4$, and the substitution by ethylene glycol was not performed, a positive electrode active material for lithium ion batteries of Comparative Example 1 was manufactured based on Example 2.

Comparative Example 2

Except that the reaction concentration of the fluid including raw materials was set to 0.3 mol/L in terms of $LiFePO_4$, and the amounts of the raw materials were reduced respectively, a positive electrode active material for lithium ion batteries of Comparative Example 2 was manufactured based on Example 2.

Comparative Example 3

Except that the reaction concentration of the fluid including raw materials was set to 2.0 mol/L in terms of $LiFePO_4$, and the amounts of the raw materials were increased respectively, a positive electrode active material for lithium ion batteries of Comparative Example 3 was manufactured based on Example 2.

Comparative Example 4

Except that the reaction concentration of the fluid including raw materials was set to 1.0 mol/L in terms of $LiFePO_4$, and the substituting amounts of ethylene glycol was set to 1.5% by mass with respect to the total mass supplied to the hydrothermal reaction, a positive electrode active material for lithium ion batteries of Comparative Example 4 was manufactured based on Example 2.

Comparative Example 5

Except that the reaction concentration of the fluid including raw materials was set to 1.0 mol/L in terms of $LiFePO_4$, and the substituting amounts of ethylene glycol was set to 50% by mass with respect to the total mass supplied to the hydrothermal reaction, a positive electrode active material for lithium ion batteries of Comparative Example 5 was manufactured based on Example 2.

Comparative Example 6

Except that ferrous chloride ($FeCl_2$) was substituted with manganese (II) chloride ($MnCl_2$), the reaction concentration of the fluid including raw materials was set to 1.0 mol/L in terms of $LiMnPO_4$, and the substitution by ethylene glycol was not performed, a positive electrode active material for lithium ion batteries of Comparative Example 6 was manufactured based on Example 2.

Comparative Example 7

Except that ferrous chloride ($FeCl_2$) was substituted with cobalt (II) chloride ($CoCl_2$), the reaction concentration of the fluid including raw materials was set to 1.0 mol/L in terms of $LiCoPO_4$, and the substitution by ethylene glycol was not performed, a positive electrode active material for lithium ion batteries of Comparative Example 7 was manufactured based on Example 2.

Comparative Example 8

Except that ferrous chloride ($FeCl_2$) was substituted with nickel (II) chloride ($NiCl_2$), the reaction concentration of the fluid including raw materials was set to 1.0 mol/L in terms of $LiNiPO_4$, and the substitution by ethylene glycol was not performed, a positive electrode active material for lithium ion batteries of Comparative Example 8 was manufactured based on Example 2.

[Evaluation of the Positive Electrode Active Material for Lithium Ion Batteries]

For each of the positive electrode active materials of Examples 1 to 12 and Comparative Examples 1 to 8, the average primary particle diameter and the specific surface area were measured by the methods below.

(1) Average Primary Particle Diameter

An field emission scanning electron microscope (FE-SEM) image was photographed at a 50 thousand times magnification using a field emission scanning electron microscope (FE-SEM), 20 fine particles were randomly selected from a scope of a single view on the FE-SEM image, and the average value of the measured values of the particle diameters of the fine particles were used as the average primary particle diameter.

(2) Specific Surface Area

The specific surface area ($m^2/g$) of the positive electrode active material was measured using the specific surface area measuring equipment BELSORP II (manufactured by BEL Japan).

The characteristics of each of the positive electrode active materials of Examples 1 to 9 and Comparative Examples 1 to 5 are shown in Table 1, and the characteristics of each of the positive electrode active materials of Examples 10 to 12 and Comparative Examples 6 to 8 are shown in Table 2, respectively.

Figure 2:
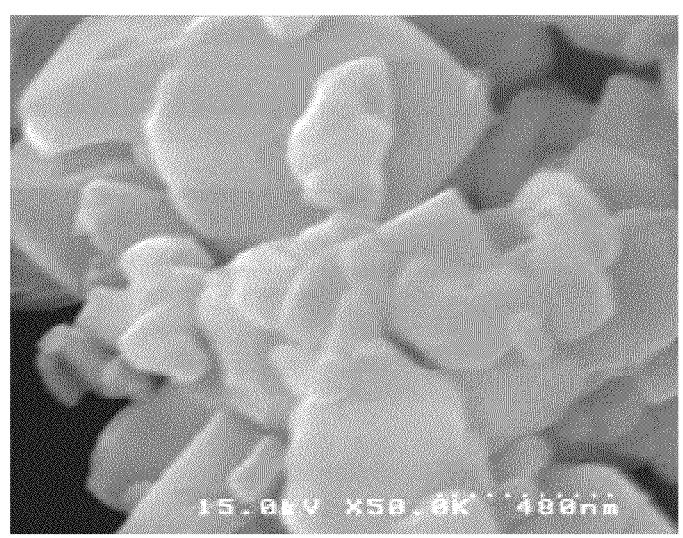
FIG. 2 is a field emission scanning electron microscope (FE-SEM) image showing a positive electrode active material of Comparative Example 1.

In addition, the field emission scanning electron microscope (FE-SEM) image of the positive electrode active material of Example 2 is shown in FIG. 1, and the field emission scanning electron microscope (FE-SEM) image of the positive electrode active material of Comparative Example 1 is shown in FIG. 2, respectively.

TABLE 1

|  | Organic solvent | | Reaction concentration (mol/L) | Average primary particle diameter (nm) | Specific surface area ($m^2/g$) |
| --- | --- | --- | --- | --- | --- |
|  | Composition | Substitution amount (% by mass) |  |  |  |
| Example 1 | Ethylene glycol | 10 | 0.5 | 65 | 11 |
| Example 2 | Ethylene glycol | 10 | 1.0 | 45 | 15 |
| Example 3 | Ethylene glycol | 10 | 1.5 | 60 | 14 |
| Example 4 | Ethylene glycol | 3 | 1.0 | 70 | 9 |
| Example 5 | Ethylene glycol | 30 | 1.0 | 30 | 16 |
| Example 6 | Glycerin | 10 | 1.0 | 60 | 11 |
| Example 7 | Diethylene glycol | 10 | 1.0 | 60 | 11 |

TABLE 1-continued

| | Organic solvent | | Reaction concentration (mol/L) | Average primary particle diameter (nm) | Specific surface area (m$^2$/g) |
|---|---|---|---|---|---|
| | Composition | Substitution amount (% by mass) | | | |
| Example 8 | N-methyl-2-pyrrolidinone | 10 | 1.0 | 55 | 12 |
| Example 9 | γ-butyrolactone | 10 | 1.0 | 60 | 11 |
| Comparative Example 1 | — | — | 1.0 | 500 | 4 |
| Comparative Example 2 | Ethylene glycol | 10 | 0.3 | 400 | 5 |
| Comparative Example 3 | Ethylene glycol | 10 | 2.0 | —* | —* |
| Comparative Example 4 | Ethylene glycol | 1.5 | 1.0 | 400 | 5 |
| Comparative Example 5 | Ethylene glycol | 50 | 1.0 | 40 | 15 |

*Subgrain phase was generated

TABLE 2

| | Element M | Organic solvent | | Reaction concentration (mol/L) | Average primary particle diameter (nm) | Specific surface area (m$^2$/g) |
|---|---|---|---|---|---|---|
| | | Composition | Substituting amount (% by mass) | | | |
| Example 10 | Mn | Ethylene glycol | 10 | 1.0 | 50 | 12 |
| Example 11 | Co | Ethylene glycol | 10 | 1.0 | 50 | 12 |
| Example 12 | Ni | Ethylene glycol | 10 | 1.0 | 50 | 13 |
| Comparative Example 6 | Mn | — | — | 1.0 | 500 | 5 |
| Comparative Example 7 | Co | — | — | 1.0 | 600 | 5 |
| Comparative Example 8 | Ni | — | — | 1.0 | 800 | 4 |

[Manufacture of a Lithium Ion Rechargeable Battery]

The following treatments were performed on each of the positive electrode active materials of Examples 1 to 12 and Comparative Examples 1 to 8 to manufacture a lithium ion rechargeable battery of each of Examples 1 to 12 and Comparative Examples 1 to 8.

Firstly, 90 parts by mass of the positive electrode active material, 5 parts by mass of acetylene black as a conduction aid, 5 parts by mass of polyvinylidene fluoride (PVDF) as a binder, and N-methyl-2-pyrrolidone (NMP) as a solvent were mixed.

Next, the mixture was kneaded using a 3-roll mill so as to manufacture a positive electrode active material paste.

Next, the positive electrode active material paste was coated on a 30 μm-thick aluminum current collector foil, and then was dried at 100° C. under a reduced pressure, thereby manufacturing a 30 μm-thick positive electrode.

Next, the positive electrode was formed into a 2 cm$^2$ disk by punching, and was dried under a reduced pressure. After that, a lithium ion rechargeable battery was manufactured under a dry argon atmosphere using the positive electrode, a negative electrode and a stainless steel 2016 coin cell.

In the battery, metallic lithium as the negative electrode, a porous polypropylene film as the separator, and a solution obtained by mixing 1 mole of LiPF$_6$ with a solution in which ethylene carbonate (EC) and diethyl carbonate (DEC) had been mixed in a ratio of 3 to 7 as the electrolytic solution were used.

[Battery Charging and Discharging Test]

Battery charging and discharging tests were performed using the lithium ion rechargeable batteries of Examples 1 to 12 and Comparative Examples 1 to 8.

Herein, the cutoff voltages were set to 2.0 to 4.0 V for Examples 1 to 9 and Comparative Examples 1 to 5 (M=Fe), 2.0 to 4.5 V for Example 10 and Comparative Example 6 (M=Mn), 2.0 to 5.0 V for Example 11 and Comparative Example 7 (M=Co), and 2.0 to 5.5 V for Example 12 and Comparative Example 8 (M=Ni). In the measurement of the initial discharge capacity, charging was performed at 0.1 C, and discharging was performed at 0.1 C.

Furthermore, for Examples 1 to 9 and Comparative Examples 1 to 5 (M=Fe), as the measurement of the other discharge capacity, tests were performed in which charging was performed at 0.2 C, and discharge capacities were measured respectively at 0.1 C, 0.2 C, 5 C, 8 C, and 12 C. In addition, the rate (%) of the discharge capacity at 5 C to the discharge capacity at 0.2 C was used as the discharge retention rate (5 C/0.2 C retention rate). The discharge retention rate was determined such that the more favorable, the closer it approached to 100%.

The discharge capacities and the discharge retention rates (5 C/0.2 C retention rate) of Examples 1 to 9 and Comparative Examples 1 to 5 are shown in Table 3, and the initial discharge capacities (0.1 C/0.1 C) of Examples 10 to 12 and Comparative Examples 6 to 8 are shown in Table 4, respectively.

TABLE 3

| | Discharge capacity (mAh/g) | | | | | 5 C/0.2 C retention rate (%) |
|---|---|---|---|---|---|---|
| | 0.1 C/0.1 C | 0.2 C/0.2 C | 0.2 C/5 C | 0.2 C/8 C | 0.2 C/12 C | |
| Example 1 | 158 | 155 | 141 | 119 | 100 | 91 |
| Example 2 | 157 | 156 | 140 | 123 | 99 | 90 |
| Example 3 | 157 | 155 | 141 | 120 | 101 | 91 |
| Example 4 | 159 | 156 | 140 | 115 | 93 | 90 |
| Example 5 | 159 | 156 | 142 | 123 | 106 | 91 |
| Example 6 | 157 | 155 | 138 | 118 | 101 | 89 |
| Example 7 | 158 | 156 | 140 | 121 | 103 | 90 |
| Example 8 | 157 | 155 | 138 | 117 | 99 | 89 |
| Example 9 | 156 | 154 | 137 | 116 | 98 | 89 |
| Comparative Example 1 | 158 | 156 | 120 | 100 | 60 | 77 |
| Comparative Example 2 | 158 | 155 | 121 | 98 | 58 | 78 |
| Comparative Example 3 | —* | —* | —* | —* | —* | —* |
| Comparative Example 4 | 158 | 156 | 125 | 103 | 70 | 80 |
| Comparative Example 5 | 151 | 142 | 118 | 100 | 70 | 83 |

*Subgrain phase was generated, and it was not possible to manufacture an electrode.

TABLE 4

| | Initial discharge capacity (mAh/g) (0.1 C/0.1 C) |
|---|---|
| Example 10 | 100 |
| Example 11 | 110 |
| Example 12 | 60 |
| Comparative Example 6 | 10 |
| Comparative Example 7 | 40 |
| Comparative Example 8 | 8 |

According to Tables 1 to 4 and FIGS. 1 and 2, the following was found.

(1) As shown in Examples 1 to 12, it was confirmed that the average primary particle diameter of the positive electrode active material can be controlled in a range of 30 nm to 80 nm by substituting a part of water included in the slurry with an aqueous organic solvent.

(2) It was possible to confirm that, in the positive electrode active materials of Examples 1 to 12, the specific surface areas were increased in comparison to the positive electrode active material of Comparative Example 1; however, in the lithium ion rechargeable batteries of Examples 1 to 9, the initial discharge capacities and the discharge retention rates (5 C/0.2 C retention rate) were improved in comparison to the lithium ion rechargeable battery of Comparative Example 1, and the improvement of the discharging and charging characteristics and the securing of the initial discharge capacity were achieved.

In addition, it was possible to confirm that, in the lithium ion rechargeable batteries of Examples 10 to 12, the initial discharge capacities (0.1 C/0.1 C) were improved in comparison to the lithium ion rechargeable batteries of Comparative Examples 6 to 8, and the initial discharge capacities were secured.

(3) In Comparative Example 2 in which the reaction concentration of the raw material fluid was smaller than the range of the present invention, Comparative Example 2 exhibited the significantly large average primary particle diameter and the degraded discharging retention rate as compared with Example 2. In Comparative Example 3 in which the reaction concentration of the fluid including raw materials was larger than the range of the present invention, subgrain phase was generated as impurities, and it was not possible to manufacture an electrode.

(4) In Comparative Example 4 in which the mass of the aqueous organic solvent in the total mass of the mixture was smaller than the preferable range of the present invention, Comparative Example 4 exhibited the significantly large average primary particle diameter and the degraded discharging retention rate as compared with Example 2. In Comparative Example 5 in which the mass of the aqueous organic solvent in the total mass of the mixture was larger than the preferable range of the present invention, the average primary particle diameter was small, but the discharge retention rate was degraded.

Aforementioned Examples showed cases in which tests were performed under the conditions of constant temperature and constant pressure, but it was confirmed that the effects of the present application could be stably obtained even under other high-temperature and high-pressure conditions.

INDUSTRIAL APPLICABILITY

The present invention provides a method of manufacturing a positive electrode active material for lithium ion batteries, a positive electrode active material for lithium ion batteries, an electrode for lithium ion batteries and a lithium ion battery, wherein the average primary particle diameter of the fine particles of $LiMPO_4$ (wherein M represents one or two or more kinds selected from the group of Fe, Mn, Co and Ni) is controlled to improve the initial discharge capacity or high-speed charging and discharging characteristics.

The method of manufacturing a positive electrode active material for lithium ion batteries according to the present invention is a method in which a mixture, which contains $Li_3PO_4$ or a Li source and a phosphoric acid source, and one or two or more kinds selected from a group of a Fe source, a Mn source, a Co source and a Ni source, wherein they are included in an amount in terms of 0.5 to 1.5 mol/L of $LiMPO_4$ (wherein M represents one or two or more kinds selected from the group of Fe, Mn, Co and Ni), and also contains water and an aqueous organic solvent having a boiling point of 150° C. or more, is reacted at a high temperature and a high pressure to generate the fine particles of $LiMPO_4$ (wherein M represents one or two or more kinds selected from the group of Fe, Mn, Co and Ni) having an average primary particle diameter of from 30 to 80 nm. Accordingly, it is possible to improve the charging and discharging characteristics and secure the initial discharge capacity by applying the obtained positive electrode active material for lithium ion batteries to lithium ion batteries, particularly to the positive electrodes in lithium ion rechargeable batteries, and therefore the present invention has an extremely large industrial meaning.

We claim:

1. A method of manufacturing a positive electrode active material for lithium ion batteries, comprising:
    preparing a mixture containing (A) Li3PO4, or a Li source and a phosphoric acid source; (B) at least one selected from the group of an Fe source, a Mn source, a Co source and a Ni source; water; and an aqueous organic solvent having a boiling point of 150° C. or more,
    wherein the amounts of (A), (B), and water in the mixture are adjusted to amounts necessary to manufacture therefrom LiMPO4 at a concentration of more than or equal to 0.5 mol/L and less than or equal to 1.5 mol/L, wherein M represents at least one selected from the group of Fe, Mn, Co, and Ni;
    substituting a part of the water with additional aqueous organic solvent having a boiling point of 1500° C. or more so that the total content of the aqueous organic solvent is 3 to 30% by mass of the total mass of the mixture, before the reaction starts at a high temperature and a high pressure; and
    generating fine particles of LiMPO4 having an average primary particle diameter of 30 to 80 nm by reacting the (A), the (B), water, and the aqueous organic solvent at the high temperature and the high pressure, wherein M represents at least one selected from the group of Fe, Mn, Co, and Ni.

2. The method of manufacturing a positive electrode active material for lithium ion batteries according to claim 1,
    wherein the aqueous organic solvent is at least one selected from multivalent alcohols, amides, esters and ethers.

3. The method of manufacturing a positive electrode active material for lithium ion batteries according to claim 1,
    wherein the high temperature is more than or equal to 120° C. and less than or equal to 250° C., and the high pressure is more than or equal to 0.2 MPa and less than or equal to 4.0 MPa.

4. The method of manufacturing a positive electrode active material for lithium ion batteries according to claim 1,
    wherein the Li source is at least one selected from a group consisting of lithium hydroxide, lithium carbonate, lithium chloride, lithium acetate, lithium oxalate and hydrates thereof; the phosphoric acid source is at least one selected from a group consisting of orthophosphoric acid, metaphosphoric acid, ammonium dihydrogenphosphate, diammonium hydrogen phosphate, ammonium phosphate and hydrates thereof; the Fe source is at least one selected from a group consisting of ferrous chloride, ferrous sulfate, ferrous acetate and hydrates thereof; the Mn source is at least one selected from a group consisting of manganese (II) chloride, manganese (II) sulfate, manganese (II) acetate, manganese (II) nitrate and hydrates thereof; the Co source is at least one selected from a group consisting of cobalt (II) chloride, cobalt (II) sulfate, cobalt (II) acetate and hydrates thereof; and the Ni source is at least one selected from a group consisting of nickel (II) chloride, nickel (II) sulfate, nickel (II) acetate and hydrates thereof.

5. The method of manufacturing a positive electrode active material for lithium ion batteries according to claim 2,
    wherein the aqueous organic solvent is one or a mixture of two or more kinds selected from the group consisting of ethylene glycol, propylene glycol, hexylene glycol, glycerine, formamide, N-methylformamide, 2-pyrrolidine, N-methyl-2-pyrrolidinone, γ-butyrolactone, diethylene glycol, and ethylene glycol monobutyl ether.

6. The method of manufacturing a positive electrode active material for lithium ion batteries according to claim 1,
    wherein the high temperature is 100° C. to 300° C., and the high pressure is 0.1 to 10 MPa.

7. The method of manufacturing a positive electrode active material for lithium ion batteries according to claim 1,
    wherein the surfaces of the fine particles of $LiMPO_4$ are coated with carbon.

8. The method of manufacturing a positive electrode active material for lithium ion batteries according to claim 1,
    wherein the reaction product including the fine particles of $LiMPO_4$ is separated into the fine particles of $LiMPO_4$ and a Li-containing liquid waste, wherein the Li-containing liquid waste is a solution comprising unreacted Li.

9. The method of manufacturing a positive electrode active material for lithium ion batteries according to claim 8,
    wherein the reaction product is separated by a method selected from the group consisting of decantation, centrifugation, and filter filtration.

* * * * *